US011874765B2

(12) United States Patent
Li et al.

(10) Patent No.: US 11,874,765 B2
(45) Date of Patent: Jan. 16, 2024

(54) BUFFER POOL MANAGEMENT

(71) Applicant: International Business Machines Corporation, Armonk, NY (US)

(72) Inventors: Shuo Li, Beijing (CN); Xiaobo Wang, Beijing (CN); Sheng Yan Sun, BeiJing (CN); Hong Mei Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/333,372

(22) Filed: May 28, 2021

(65) Prior Publication Data
US 2022/0382671 A1 Dec. 1, 2022

(51) Int. Cl.
*G06F 12/02* (2006.01)
*G06F 12/123* (2016.01)
(52) U.S. Cl.
CPC .......... *G06F 12/023* (2013.01); *G06F 12/124* (2013.01); *G06F 2212/1044* (2013.01); *G06F 2212/163* (2013.01)
(58) Field of Classification Search
CPC .................. G06F 12/023; G06F 12/124; G06F 2212/163; G06F 2212/1044
See application file for complete search history.

(56) References Cited

U.S. PATENT DOCUMENTS

| 9,548,912 | B2 | 1/2017 | Helin | |
|---|---|---|---|---|
| 9,846,655 | B1* | 12/2017 | Zhao | ..................... G06F 3/0604 |
| 10,114,908 | B2 | 10/2018 | Parkkinen | |
| 2010/0199042 | A1* | 8/2010 | Bates | .................... H04L 9/0625 |
| | | | | 711/135 |
| 2013/0227207 | A1* | 8/2013 | Katz | ................... G06F 12/0246 |
| | | | | 711/103 |
| 2016/0239513 | A1 | 8/2016 | Petculescu | |
| 2017/0242858 | A1 | 8/2017 | Lee | |
| 2021/0055869 | A1* | 2/2021 | Shah | ..................... G06F 3/0679 |

OTHER PUBLICATIONS

Mell, et al., "The NIST Definition of Cloud Computing," Recommendations of the National Institute of Standards and Technology, U.S. Department of Commerce, Special Publication 800-145, Sep. 2011, 7 pgs.

* cited by examiner

*Primary Examiner* — Baboucarr Faal
(74) *Attorney, Agent, or Firm* — Haley J. McClory

(57) ABSTRACT

A processor may allocate a first buffer segment from a buffer pool. The first buffer segment may be configured with a first contiguous range of memory for a first data partition of a data table. The first data partition comprising a first plurality of data blocks. A processor may store the first plurality of data blocks in order into the first buffer segment. A processor may retrieve the target data block from the first buffer segment in response to a data access request for a target data block of the first plurality of data blocks.

20 Claims, 11 Drawing Sheets

US 11,874,765 B2

BUFFER POOL MANAGEMENT

BACKGROUND

The present disclosure generally relates to database query techniques and more particularly, the use of buffer pool.

Historically, many large databases are primarily stored on disks. These disk-based databases often use buffer pools to retrieve newly accessed data. Buffer pools can improve access performance in large databases. A buffer pool may be generally understood as memory comprising memory blocks (e.g., pages) for storing data accessed from the disk or modified in memory. The buffer pool improves performance by allowing data to be accessed from memory instead of from the disk when performing data access operations.

SUMMARY

Embodiments of the present disclosure include a method, computer program product, and system for managing buffer pools. A processor may allocate from a buffer pool a first buffer segment with a first contiguous range of memory for a first data partition of a data table. The first data partition may include a first plurality of data blocks. A processor may store the first plurality of data blocks in order into the first buffer segment. A processor may retrieve the target data block from the first buffer segment, responsive to a data access request for a target data block of the first plurality of data block.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and are not intended to limit the disclosure.

Figure 1:
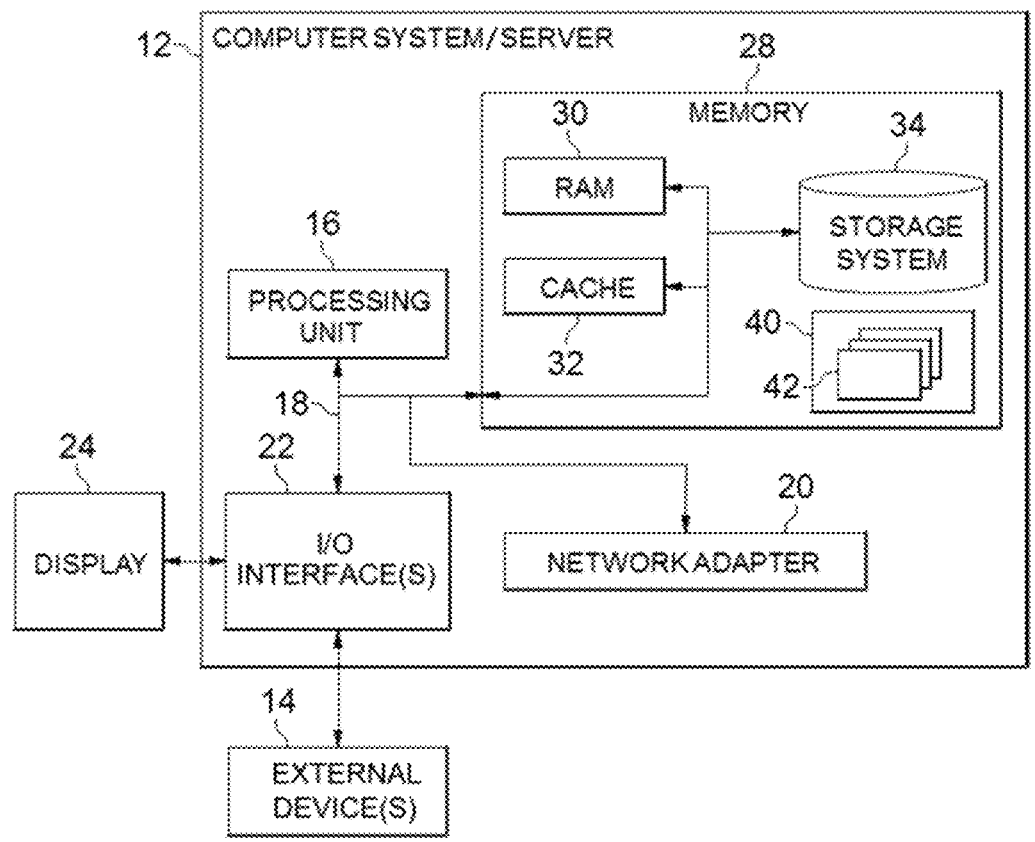
FIG. 1 depicts a cloud computing, in accordance with the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
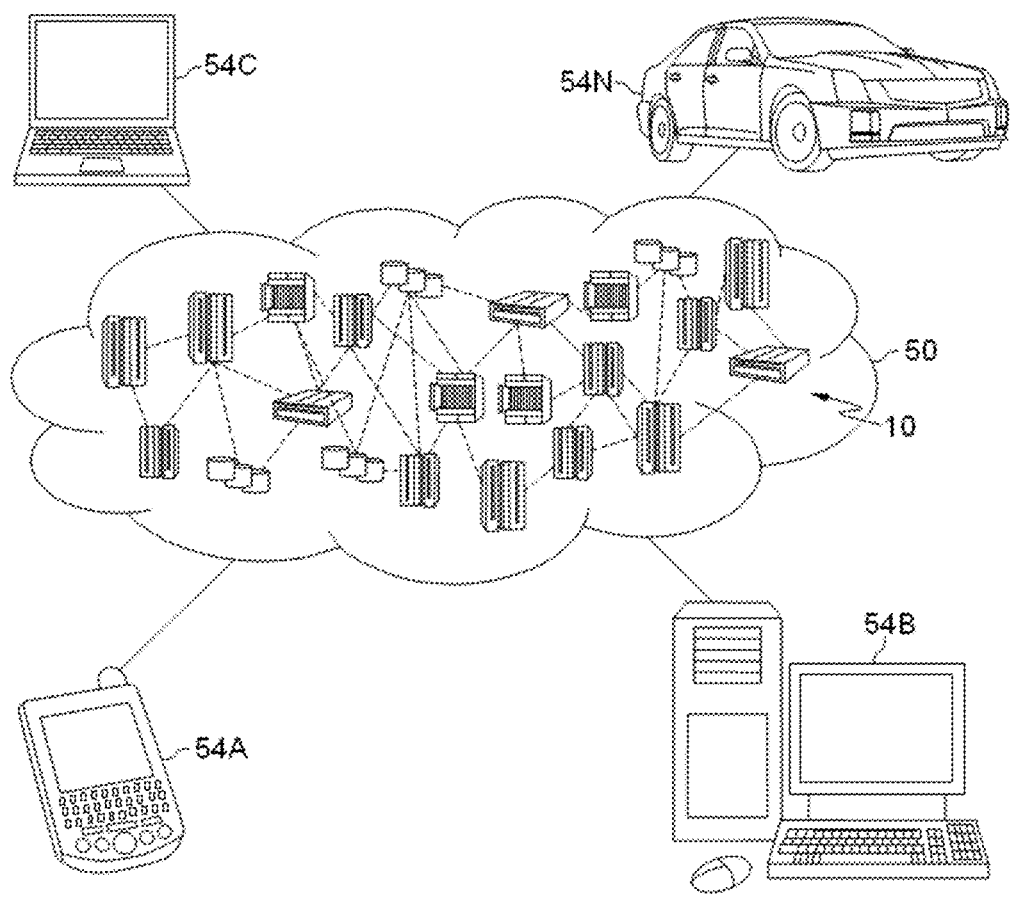
FIG. 2 depicts a cloud computing environment, in accordance with the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
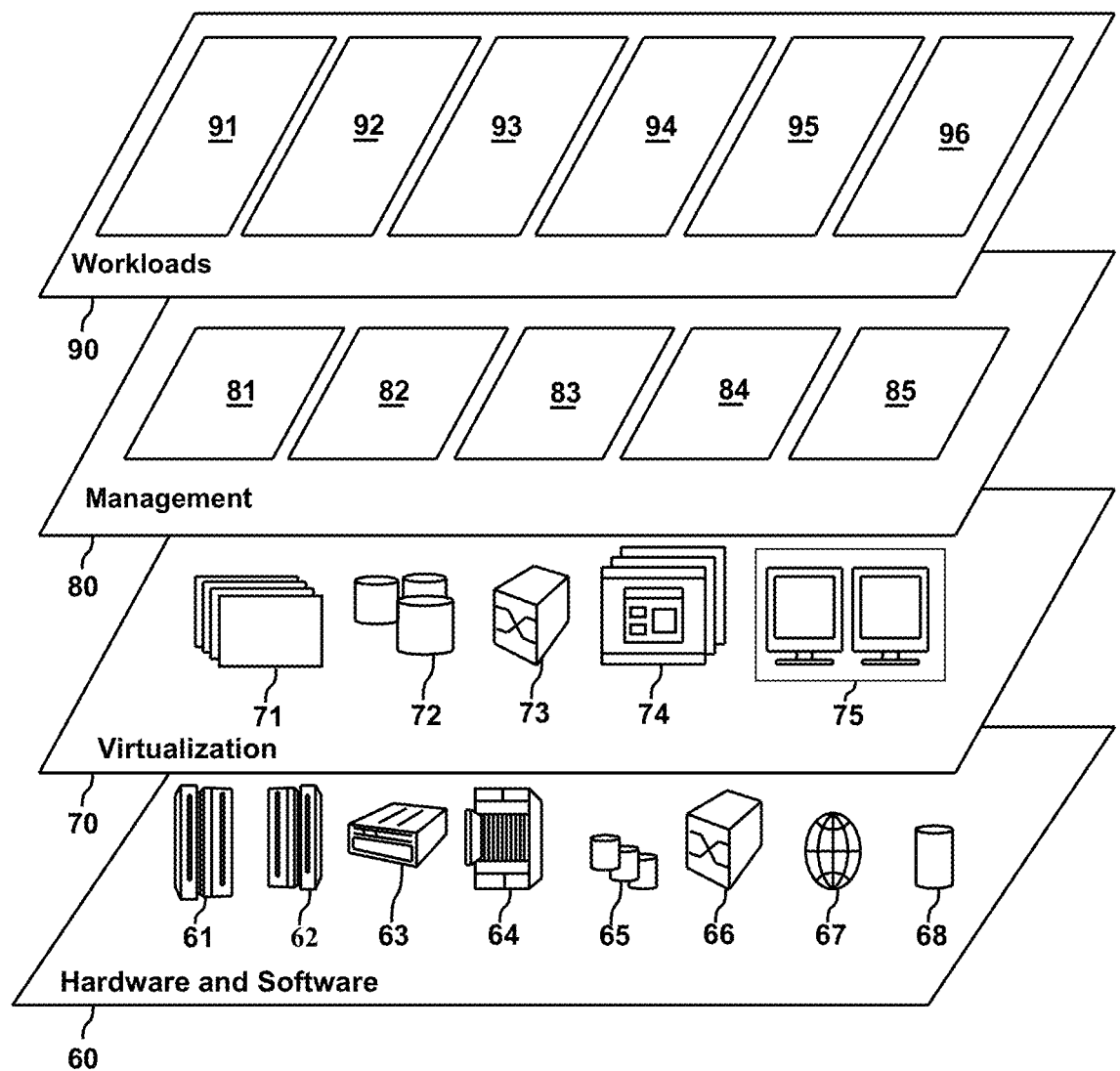
FIG. 3 depicts abstraction model layers, in accordance with the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and buffer pool management 96. The functionalities of buffer pool management 96 will be described in the following embodiment of the present disclosure.

Figure 4:
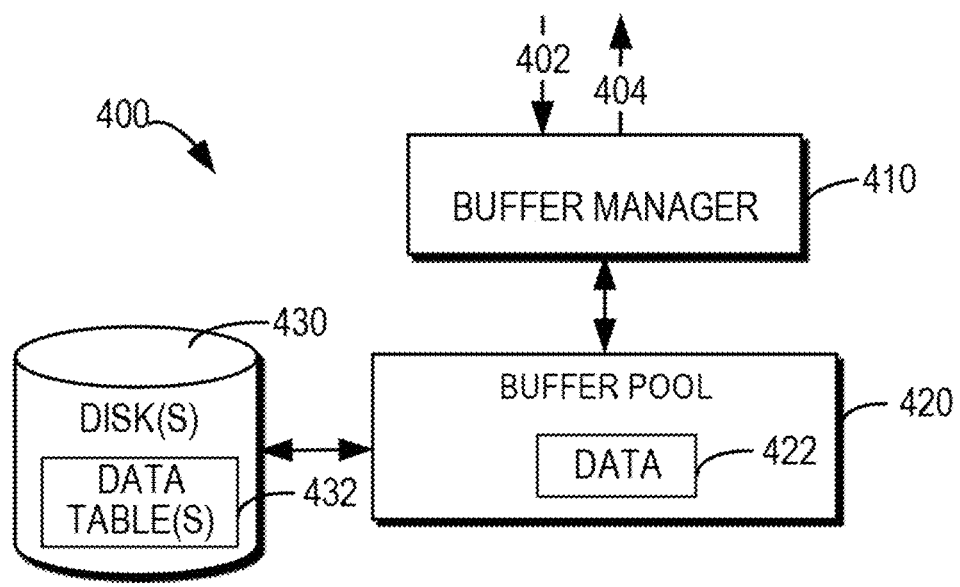
FIG. 4 depicts a block diagram of an environment, in accordance with the present disclosure.

FIG. 4 illustrates a block diagram of an environment 400 in which embodiments of the present disclosure may be implemented. In the environment 400, a buffer manager 410 may be configured to perform buffer management on a buffer pool 420. The buffer pool 420 may be a region of a physical memory storage used to cache data 422 that can be accessed from one or more disks 430 during operation. The data 422 may include at least a partition of a data table(s) 432 stored in the disk(s) 430.

Although other schema may be applied, a storage space of the buffer pool 420 may be divided into memory blocks of predetermined size, called "pages." As such, an example of a memory block includes a "page," however, the principles contemplated herein are not limited to that.

In some embodiments, the buffer manager 410 may be implemented by computer system/server (e.g., computer system/server 12 of FIG. 1) or by multiple computer systems/servers in a distributed manner. In particular, the buffer manager 410 may support management of the buffer pool 420. The buffer manager 410 may receive a data access request 402 for target data. The buffer manager 410 may determine whether the target data is buffered in the buffer pool 420. If the target data is stored in the buffer pool 420 (e.g., a cache hit) as at least a partition of the data 422, the buffer manager 410 may directly retrieve the target data from the buffer pool 420 as a response 404 to the data access request 402. In some embodiments, if the target data is not found in the buffer pool 420 (e.g., a cache miss), the buffer manager 410 may access or cause other managers to access the target data from the disk(s) 430.

The arrangement of the buffer pool 420 can improve performance by allowing data to be accessed from memory instead of from disk as the in-memory access speed is faster than the access speed of the disk.

A buffer pool may typically be allocated with a certain size of memory space. Conventionally, data is stored in a buffer pool as a queue which comprises multiple memory blocks chained together. The queue maintains the stored data according to a replacement mechanism based on a least recently used (LRU) algorithm, and such a queue is referred to as a LRU chain. The LRU algorithm may control which data is stored in the buffer pool and which data is to be evicted from the buffer pool. According to the LRU algorithm, the "most recently used" data is moved to the head of the queue while simultaneously data that have not been used one step is moved towards the end of the queue. During operations, data are migrated in and out of the memory blocks of the LRU chain frequently. In addition, the LRU chain may require data maintained in units of memory blocks. The buffer manager may maintain a hash table with respective pointers pointing to memory blocks of the buffer pool, to support addressing the data stored in the memory blocks.

Although memory techniques have been developed to support buffering of a larger size of data in memory, the maintenance of the LRU chain may create performance bottlenecks. As the size of the buffer pool increases, a large size of a hash table may be generated, and more time may be consumed to search among the hash table to locate the pointer to a target memory block. On the other hand, frequent data migration among the memory blocks in the LRU chain may require a massive amount of latch usage. A latch may generally be defined as an internal lock that protects memory from concurrent updates. The massive amount of latch usage by the LRU chain may lead to significant degradation in data access performance.

Therefore, there is a need for improved buffer pool management. According to example embodiments of the present disclosure, a solution for buffer pool management is proposed. In this solution, a buffer pool may be built to include a contiguous buffer part. A buffer segment with a contiguous range of memory may be allocated to store at least a partition of a data table. The data table may include a plurality of data blocks. The data partition of the data table may be stored in an order of its data blocks. The data blocks stored in the buffer segment can be accessed in response to data access requests. Since a contiguous buffer segment may be allocated to store a large size of data in a continuous order, the data maintenance may be performed in the level of buffer segments, which can improve the access performance and effectively reduce the maintenance cost. A large size of buffer pool may be configured for buffering more data and increasing the probability of cache hits, without incurring negative impact on the access performance.

Other advantages of the present disclosure may be described with reference to the example embodiments and the accompanying drawings below.

Figure 5:
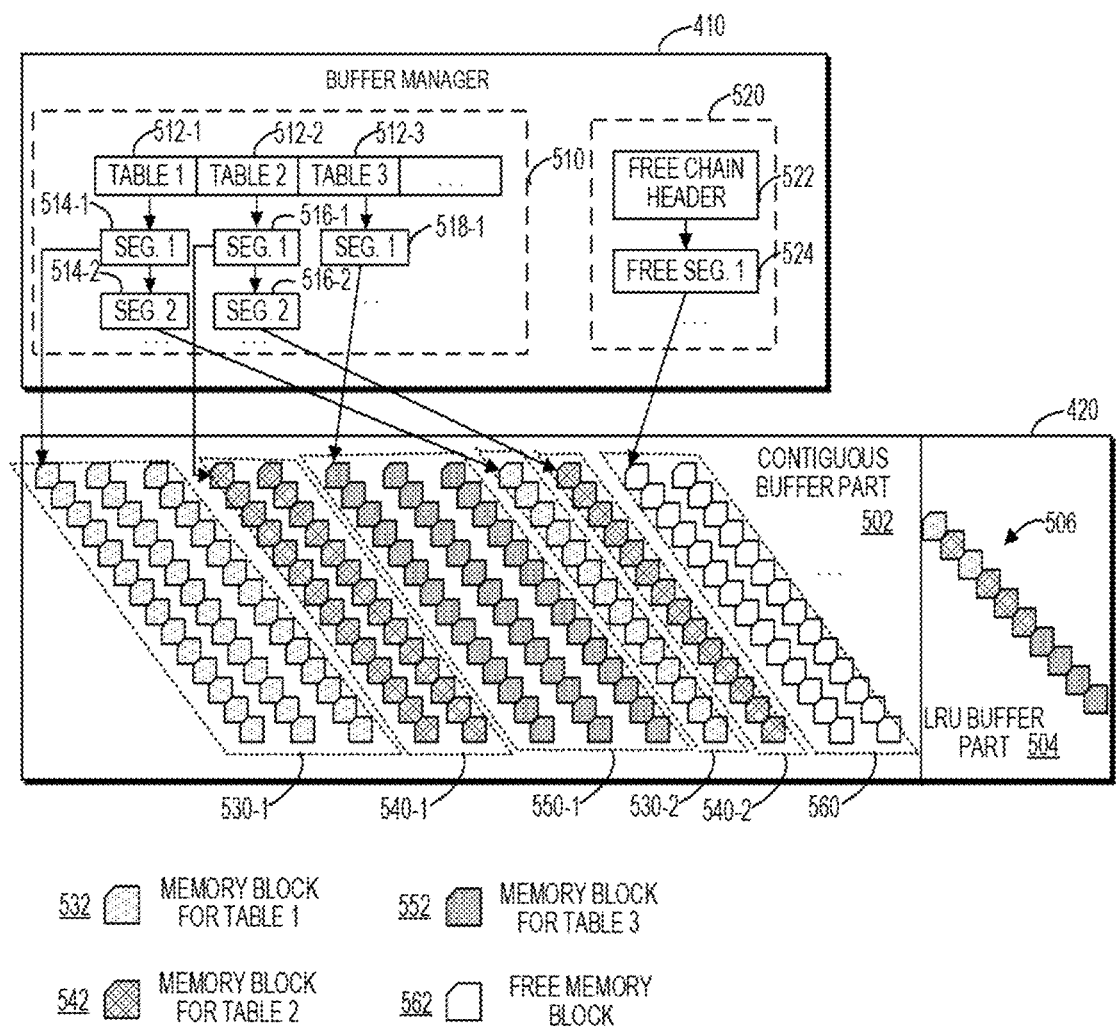
FIG. 5 depicts example buffer architecture, in accordance with the present disclosure.

Reference is first made to FIG. 5, which illustrates example buffer architecture in accordance with embodiments of the present disclosure. For the purpose of illustration, the buffer manager 410 and the buffer pool 420 of FIG. 4 may be involved in the buffer architecture of FIG. 5. The disk(s) 430 are omitted here for the purpose of brevity and such omission should not be considered limiting.

According to embodiments of the present disclosure, the buffer pool 420 may be built to include a contiguous buffer part 502. Contiguous buffer part 502 may store data tables or parts thereof and may be of a relatively large size. In some embodiments, the buffer pool 420 may further include a LRU buffer part 504 to maintain a LRU chain 506 for storing fragmented data with a small size and/or data overflowing from the contiguous buffer part 502. As a result, the buffer pool 420 may be divided into two parts to enable different data buffering mechanisms. In some embodiments, the contiguous buffer part 502 may occupy a larger range of memory of the buffer pool 420 than the LRU buffer part 504.

During operation, instead of allocating separate memory blocks to buffer data blocks, the buffer manager 410 may dynamically allocate a buffer segment with a contiguous range of memory from the contiguous buffer part 502 to store a partition of a data table or the whole data table in order. As such, data blocks of the stored data partition or the whole data table may be easily accessed from the buffer segment. In some embodiments, allocated buffer segments and the data partitions stored therein may be maintained on the basis of data tables.

As illustrated in FIG. 5, a data partition of a first data table ("TABLE 1") may be determined to be buffered into the buffer pool 420. The data partition may be a contiguous part in the first data table. The buffer manager 410 may make the decision based on the buffering of the data partition based on various factors. In one example embodiment, if a data partition of the first data table or any data included in the data partition is recently accessed or is frequently accessed, the buffer manager 410 may determine to buffer the data partition into the buffer pool 420. In other example embodiments, the buffer manager 410 may determine to buffer the data partition based on other trigger events. In some embodiments, the buffer manager 410 may determine to buffer the whole first data table.

To buffer the data partition of the first data table, the buffer manager 410 may allocate a buffer segment 530-1 with a contiguous range of memory from the buffer pool 402 and more specifically, from the contiguous buffer part 502. For example, the buffer segment 530-1 may include a plurality of contiguous memory blocks 532 in the buffer pool 402. A buffer segment with a contiguous range of memory may sometimes be referred to as a contiguous buffer segment. The allocated buffer segment may be free, without data stored therein.

In embodiments, the buffer manager 410 may store the data blocks of the data partition in order into the allocated buffer segment 530-1. The data partition may include a plurality of contiguous data blocks, where each data block may be of the same size of a memory block (e.g., a page). Data blocks may be divided from a data table in a sequential order, and may be stored in the disk(s) 430 in order. To facilitate access in the buffer segment 530-1, the buffer manager 410 may store the plurality of data blocks of the data partition sequentially into the buffer segment 530-1. For example, if the data partition to be buffered includes data blocks numbered from 500 to 1000, the data blocks numbered from 500 to 1000 may be arranged sequentially in the memory blocks 532 of the buffer segment 530-1, with each memory block 532 storing a data block.

As a result, if the buffer manager 410 receives a data access request for one or more target data blocks of the data partition stored in the buffer segment, the buffer manager 410 may locate and retrieve the one or more target data blocks from the buffer segment 530-1. As the data blocks are stored in the contiguous buffer segment, the data access and maintenance may be easy and convenient. In some embodiments, the buffer manager 410 may not need to perform data movement and replacement within the buffer segment. The access of the data blocks from the contiguous buffer segment may be further discussed in detail below.

In some embodiments, the buffer manager 410 may allocate the buffer segment for buffering the data partition based on a size of the data partition to be buffered. The size of the buffer segment may be measured by the number of contiguous memory blocks or a length of the contiguous range. In some embodiments, the buffer manager 410 may allocate a buffer segment with a size larger than or equal to the size of the data partition to be buffered. In some embodiments, the buffer manager 410 may determine the size of the buffer segment based on a predicted size of the data partition as the data table may grow to include more data, so as to meet the potential requirement of contiguous memory for buffering data.

In embodiments, the buffer manager 410 may use a slide-window mechanism to allocate a buffer segment for the data partition to be buffered. For example, if the data partition includes 500 data blocks and thus needs 500 memory blocks to store, the buffer manager 410 may allocate a buffer segment of 700 memory blocks, with 200 redundant memory blocks to store data blocks that are potentially appended to the data partition.

In some embodiments, as data in a data table grows, a further data partition, contiguous with the previously buffered data partition, may be stored into the allocated buffer segment if there is one or more free memory blocks in the allocated buffer segment. For example, after the data partition of the first data table is stored to the buffer segment 530-1 and there are a number of free memory blocks left. If the first data table is updated to include more data following or preceding the buffered data partition and the added data is to be buffered, the buffer manager 530-1 may buffer the added data in the buffer segment 530-1. The added data and the pervious data partition may be stored in the buffer segment 510 in an order of their data blocks.

In some embodiments, an allocated buffer segment may have a lower limit of size. The buffer manager 410 may allocate a buffer segment with a size larger than or equal to the lower limit of size, even if the size of the current data partition to be buffered is lower than the lower limit of size. In some embodiments, the setting of the lower limit of size may avoid too many discrete buffer segments of small size to be allocated in the contiguous buffer part 502.

The allocation of the buffer segment 530-1 for a data partition of the first data table has been discussed above. In embodiments, the buffer manager 410 may allocate buffer segments with respective contiguous ranges of memory for one or more data tables or their data partitions. As illustrated in FIG. 5, a buffer segment 540-1 may be allocated for storing a data partition of a second data table ("TABLE 2"), and a buffer segment 550-1 may be allocated for storing a data partition of a third data table ("TABLE 3"). The buffer segment 540-1 may be allocated with a contiguous range of memory, including a plurality of contiguous memory blocks 542 for storing data blocks of the data partition of the second data table in order. The buffer segment 550-1 may be allocated with a contiguous range of memory, that may include a plurality of contiguous memory blocks 552 for storing data blocks of the data partition of the third data table in order.

In embodiments, after a data partition of a data table is stored in the buffer pool 420, the buffer manager 410 may determine that a further data partition of the same data table is to be buffered. The further data partition may be contiguous with or non-contiguous with the buffered data partition in the data table. The buffer manager 410 may allocate a further buffer segment from the buffer pool 420 to store the additional data partition. In some embodiments, the buffer manager 410 may try to determine, from the contiguous buffer part 502, a free buffer segment that is contiguous with the buffer segment previously allocated for the data table. For example, after the buffer segment 530-1 is allocated to store a data partition of the first data table, to buffer a further data partition of this data table, the buffer manager 410 may try to find in the contiguous buffer part 502 a further buffer segment contiguous with the previously allocated buffer segment 530-1.

In some embodiments, if a free buffer segment contiguous with the previously allocated buffer segment is found in the contiguous buffer part 502, the buffer manager 410 may allocate the free buffer segment to store the further data partition of the data table. In some embodiments, if no free buffer segment contiguous with the previously allocated buffer segment is found in the contiguous buffer part 502, the buffer manager 410 may randomly select a free buffer segment in the contiguous buffer part 502 to store the further data partition. In some embodiments, the allocated free buffer segment is non-contiguous with the previously allocated buffer segment. For example, in FIG. 5, the buffer manager 410 may allocate a buffer segment 530-2 with a contiguous range of memory in the contiguous buffer part 502 to store the further data partition of the first data table. In embodiments, the buffer segment 530-2 may also comprise a plurality of contiguous memory blocks 532, but may be separated from the buffer segment 530-1. The data partitions stored in the buffer segments 530-1 and 530-2 may be contiguous or non-contiguous in the first data table. Similarly, for the second data table, the buffer manager 410 may also allocate a buffer segment 540-2 that is separated from the buffer segment 540-1, in the contiguous buffer part 502, to store a further data partition of the second data table.

In embodiments, if a data partition is overflowed from a buffer segment allocated for this data partition, or if the data partition grows to include additional data which overflows from the allocated buffer segment (e.g., meaning that the size of the data partition exceeds the size of the allocated buffer segment), the buffer manager 410 may store the overflowing data into the LRU chain 506 in the LRU buffer part 504 of the buffer pool 420. The data overflowing from the allocated buffer segment may be stored in the LRU chain 506 according to the LRU algorithm, which needs to move the most recently accessed data blocks in a head of the LRU chain and move the least recently accessed data blocks towards an end of the LRU chain.

In embodiments, the LRU chain 506 may include a number of memory blocks 532 storing data blocks for the first data table, a number of memory blocks 542 storing data blocks for the second data table, and a number of memory blocks 552 storing data blocks for the third data table.

In embodiments, the buffer manager 410 may store the overflow data and/or may store fragmented data portions in the LRU chain 506. For example, the buffer manger 410 may determine if a data partition of a data table to be buffered is of a small size (e.g., below a size threshold). In some embodiments, buffer manager 410 may store the data partition of the small size in the LRU chain 506. In these embodiments, discrete data partitions of a data table with small sizes may also be stored in the buffer pool 420 to enable fast access, without wasting memory associated with allocating large contiguous ranges of memory from the contiguous buffer part 502.

In embodiments, the buffer manager 410 may further maintain a hash table (not shown) to support access of the data blocks in the LRU chain 506. The access of the data blocks from the LRU chain 506, the data replacement and maintenance of the LRU chain are known to those skilled in the art and thus are not described in detailed herein.

In embodiments, the buffer manager 410 may maintain access information 510 for one or more contiguous buffer segments allocated for storing one or more data partitions of one or more data tables. In an embodiment, access information of one or more buffer segments allocated for a same data table may be maintained as a segment chain. In some embodiments, access information for a plurality of buffer segments in a segment chain may be sorted according to an order of data blocks stored in those buffer segments. In some embodiments, this may further facilitate fast locating of a target data block from the plurality of buffer segments. In some embodiments, a segment chain for a data table may be indexed based on an identity of the data table (e.g., based on a hash key generated from the identity of the data table).

As illustrated in FIG. 5, for the first data table ("TABLE 1"), in some embodiments, a table level hash tree may be maintained. A hash key 512-1 may be determined based, at least in part, on the identity of the first data table. The hash key 512-1 is pointed to a segment chain comprises access information 514-1 for the buffer segment 530-1 ("SEG. 1") and access information 514-2 for the buffer segment 530-2 ("SEG. 2"). For the second data table ("TABLE 2"), a table level hash tree may be maintained which as a hash key 512-2 determined based on the identity of the second data table. The hash key 512-2 may be pointed to a segment chain comprises access information 516-1 for the buffer segment 540-1 ("SEG. 1") and access information 516-2 for the buffer segment 540-2 ("SEG. 2"). For the third data table ("TABLE 3"), a table level hash tree may be maintained which as a hash key 512-2 determined based on the identity of the second data table. The hash key 512-2 may be pointed to a segment chain comprises access information 518-1 for the buffer segment 550-1 ("SEG. 1").

In embodiments, the access information for a buffer segment may at least include information used for locating a data block from the contiguous range of memory of the buffer segment in the case that a plurality of data blocks are stored in order. In some embodiments, access information for a buffer segment may indicate at least the contiguous range of memory of the corresponding buffer segment and a reference location for locating the plurality of data blocks. The reference location may be used to determine a relative location of a target data block to be accessed from the contiguous range of memory of the buffer segment. In some embodiments, the reference location may include a location of a start data block among the contiguous data blocks stored in the buffer segment.

Figure 6:
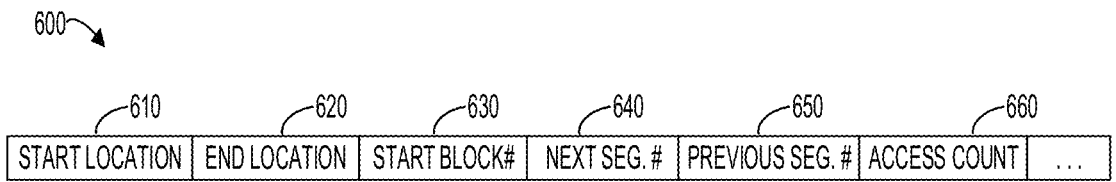
FIG. 6 depicts a data structure for access information of an allocated buffer, in accordance with the present disclosure.

FIG. 6 depicts a data structure 600 for access information of an allocated buffer segment in accordance with some embodiments of the present disclosure. As shown, access information may include a field of a start location 610 and a field of an end location 620 to indicate a start point and an end point of the contiguous range of memory. The start location and the end location may indicate the identities or addresses of a start memory block and an end memory block of the buffer segment. The access information may further include a field of a start block number (#) 630 that may indicate a reference location of a start data block among the contiguous data blocks stored in the buffer segment. As such, access information of a buffer segment may point to the start memory block storing the start data block.

In embodiments, according to the contiguous range of memory of a buffer segment and the reference location, the buffer manager 410 may be able to locate a target data block from a buffer segment. Specifically, if the buffer manager 410 receives a data access request for a target data block stored in the buffer segment 530-1, the buffer manager 410 may obtain the address of the target data block. The buffer manager 410 may first identify the segment chain for the first data table by comparing a hash key generated from an identity of a data table, from which the target data block is to be accessed, with a plurality of hash keys 512-1, 512-2, 512-3, and so on.

If the generated hash key matches with the hash key 512-1, the buffer manager 410 may determine, based on the start location and the end location indicated in access information 514-1 (e.g., pointed to by the hash key 512-1), whether the address of the target data block falls within the contiguous range of memory of the buffer segment 530-1. The start data block may be used to determine an offset of a location of the target data block from the reference location (e.g., the start location) in the buffer segment 530-1. The buffer manager 410 may access and retrieve the target data block based on the determined offset.

In some embodiments, if a data table is allocated with a plurality of buffer segments to store its data blocks, such as the buffer segments 530-1 and 530-1 for the first data tables, the buffer manager 410 may search among the access information of the plurality of buffer segments to locate a target buffer segment. In these embodiments, the target data block may then be stored in the target buffer segment.

In embodiments, to facilitate the search among the buffer segments, as referenced above, access information for a plurality of buffer segments in a segment chain may be sorted according to an order of the data blocks stored in the plurality of buffer segments. In these embodiments, as shown in the data structure 600, the access information for a buffer segment may include a field of a next segment pointer 650 pointing to a next buffer segment of the current buffer segment. In some examples, the access information may further include a field of a previous segment pointer 660 pointing to a previous buffer segment of the current buffer segment.

In embodiments, in the first data table, the access information 514-1 for the buffer segment 530-1 may be chained prior to the access information 514-2 for the buffer segment 530-2. Such embodiments, allow the data blocks of the data partition stored in the buffer segment 530-1 to be located before the data blocks of the data partition stored in the buffer segment 530-2. For example, the buffer segment 530-1 may store data blocks numbered from 500 to 1000 while the buffer segment 530-2 may store data blocks numbered from 1200 to 2000. Accordingly, the access information 514-1 for the buffer segment 530-1 may include a next segment pointer pointing to the buffer segment 530-2 and a previous segment point pointing to null. Inn embodiments, the access information 514-2 for the buffer segment 530-2 may include a next segment pointer pointing to null and a previous segment point pointing to the buffer segment 530-1.

In some embodiments, if a data table is allocated with a plurality of buffer segments to store its data blocks, such as the buffer segments 530-1 and 530-1 for the first data tables, the buffer manager 410 may construct a multi-level structure to maintain the hash key of the data table and the access information of the buffer segments, in order to reduce the searching time.

In some examples, if a buffer segment contiguous with a previously allocated buffer segment is allocated to store a further data partition of a data table, the two buffer segments may be merged as a single buffer segment with a merged contiguous range of memory. In such embodiments, the access information maintained for the previously allocated buffer segment may be directly updated based on the merged buffer segment. This may indicate the merged contiguous range of memory and a reference location that can be used to locate the data blocks to be stored in the two buffer segments. In some embodiments, if the data blocks to be stored in the two buffer segments are non-contiguous, two reference locations for the two groups of data blocks may be recorded in the access information. For example, if it is assumed that data blocks numbered from 500 to 1000 are stored in a first buffer segment and data blocks numbered from 1200 to 2000 are to be stored in a second buffer segment, a start data block numbered as 500 and a start data block numbered as 1200 may be recorded in the access information and used to locate the two groups of data blocks, respectively.

In some embodiments, as shown in FIG. 6, the access information for a buffer segment may further include a field of access count 660 which may record an access count of the buffer segment. If the buffer manager 510 determines any data block of the buffer segment is accessed responsive to a data access request, the buffer manager 510 may increase the access count (e.g., the access count may increase by one).

The access count of the buffer segment may be used in determining whether the buffer segment can be reclaimed. The buffer manager 410 may apply any suitable reclaiming policy to reclaim the buffer segment based on the access count. In some embodiments, if the access count reaches the maximum value, the buffer manager 410 may determine to reclaim the corresponding buffer segment. In other embodiments, the buffer manager 410 may determine an access frequency of the buffer segment based on the access count. If the access frequency is low (e.g., below a frequency threshold), this may indicate that the data partition stored in the buffer segment is not accessed for a long period of time. In these embodiments, the buffer manager 410 may then determine to reclaim this buffer segment. The reclaim of the buffer segment may be triggered periodically or, alternatively, in response to a predetermined event. By reclaiming a buffer segment, the memory blocks of the buffer segment may be free and can be allocated to store other data.

It would be appreciated that the data structure 600 may provide an example structure for the access information of a buffer segment. In embodiments, one or more fields of the data structure 600 may be omitted and/or replaced with other fields. For example, the field of the end location 620 may be replaced with a length of a contiguous range of memory. In embodiments, the end location may be determined based on both the start location and the length. In another embodiment, the field of the start block number (#) 630 may be replaced by other reference location of the data blocks stored in the buffer segment. In some embodiments, the buffer manager 410 may maintain other access information that can be used to locate a target data block of contiguous data blocks that are stored in order in a contiguous range of memory. The scope of the present disclosure is not limited in this regard.

In embodiments, with one or more buffer segment(s) reclaimed and allocated in the contiguous buffer part 502, there may be one or more free buffer segments with different sizes in the contiguous buffer part 502. In embodiments, all or less than all of the free buffer segments may include a plurality of contiguous free memory blocks 562. In the illustrated example of FIG. 5, a free buffer segment 560 may be included in the contiguous buffer part 502, with a contiguous range of memory.

In embodiments, buffer manager 410 may maintain a free segment chain 520 to indicate location information of the one or more free buffer segments in the buffer pool 420. This may be used to locate the one or more free buffer segments. The free segment chain 520 may include a free chain header 522 to indicate a start of the free segment chain and location information of one or more free buffer segment, such as location information 524 of the free buffer segment 560.

Figure 7:
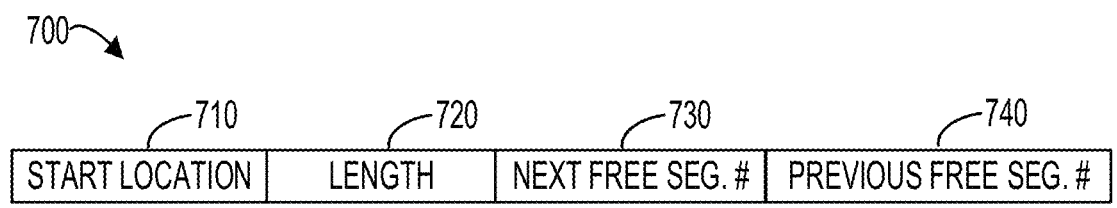
FIG. 7 depicts a data structure for location information of a free buffer segment, in accordance with the present disclosure.

FIG. 7 depicts a data structure 700 for location information of a free buffer segment in accordance with embodiments of the present disclosure. As shown, location information for a free buffer segment may include a field of a start location 710 indicating a start point of the contiguous range of memory of the buffer segment, and a field of a length 720. In embodiments, the field of a length 720 may be used to indicate a length of the contiguous range of memory. The start location and the length may be used to limit the contiguous range of memory in the buffer pool 420. In some embodiments, the free segment chain 520 may maintain a plurality of free buffer segments in the contiguous buffer part 502. The location information for a free buffer segment may further include, but is not limited to, a field of a next segment pointer 730 pointing to a next buffer segment of the current buffer segment, and a field of a previous segment pointer 740 pointing to a previous buffer segment of the current buffer segment. The next segment pointer and the previous segment pointer can facilitate search among the free buffer segments.

In embodiments, in allocating a buffer segment for storing a data table or a part thereof, the buffer manager 410 may refer to the free segment chain 520 to locate one or more free buffer segments. The buffer segment 410 may randomly select a free buffer segment to allocate for data storage or try to find a free buffer segment that may be contiguous with a previous buffer segment that may be allocated for the data table. If a free buffer segment is allocated for data storage, the free segment chain 520 may be updated to remove the location information of the allocated buffer segment.

In embodiments, during operation, the buffer manager 410 may reorganize the allocated buffer segments and free buffer segments in the contiguous buffer part 502 and the data blocks stored in the LRU chain 506, such that data blocks of a same data table may be stored in a contiguous buffer segment(s) having the largest size possible.

In embodiments, the buffer manager 410 may reorganize the allocated buffer segments. In these embodiments, the buffer manager 410 may merge data partitions of a same data table that are stored in non-contiguous buffer segments or memory blocks into a large buffer segment (if available). This may improve the data access performance regarding the data partitions. Such merging may be possible when further free buffer segments are reclaimed and/or the contiguous buffer part 502 is extended.

Figure 8A:
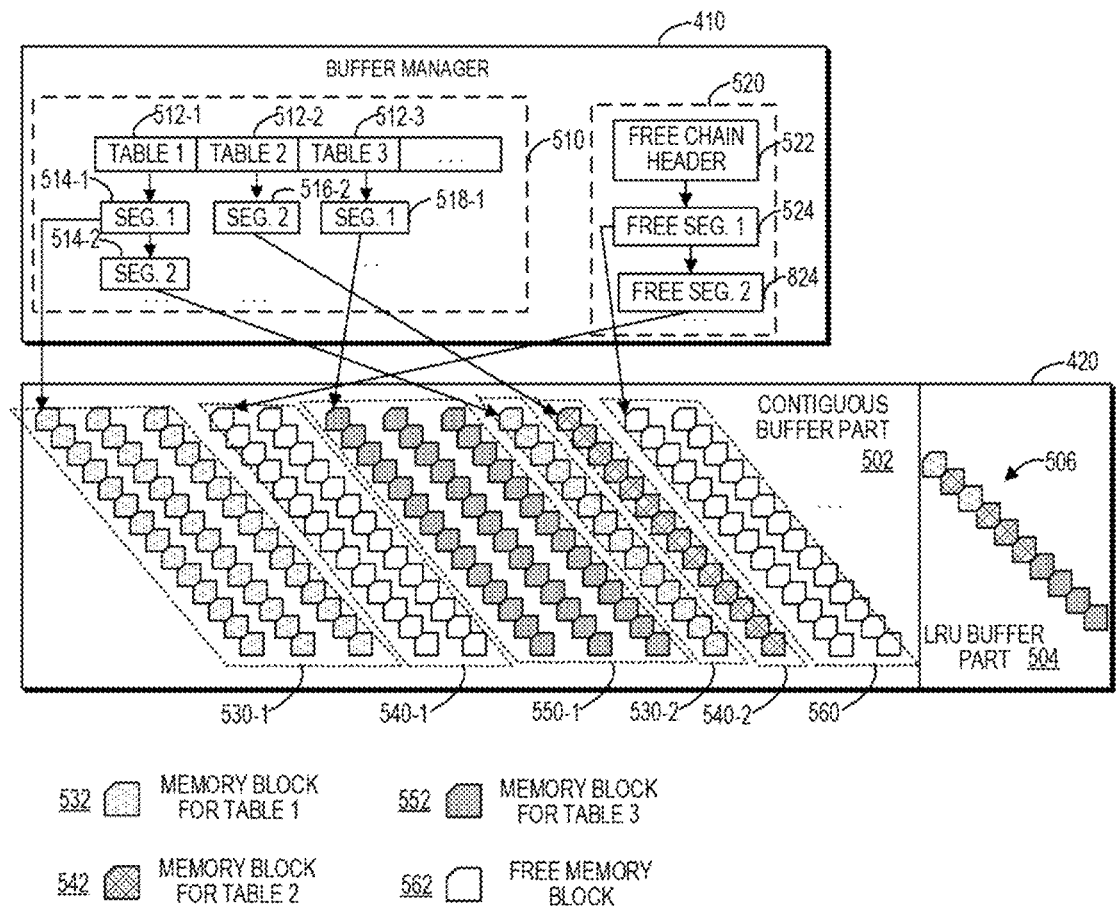
FIG. 8A depicts a first example of buffer segment merging in the buffer architecture, in accordance with the present disclosure.
Figure 8B:
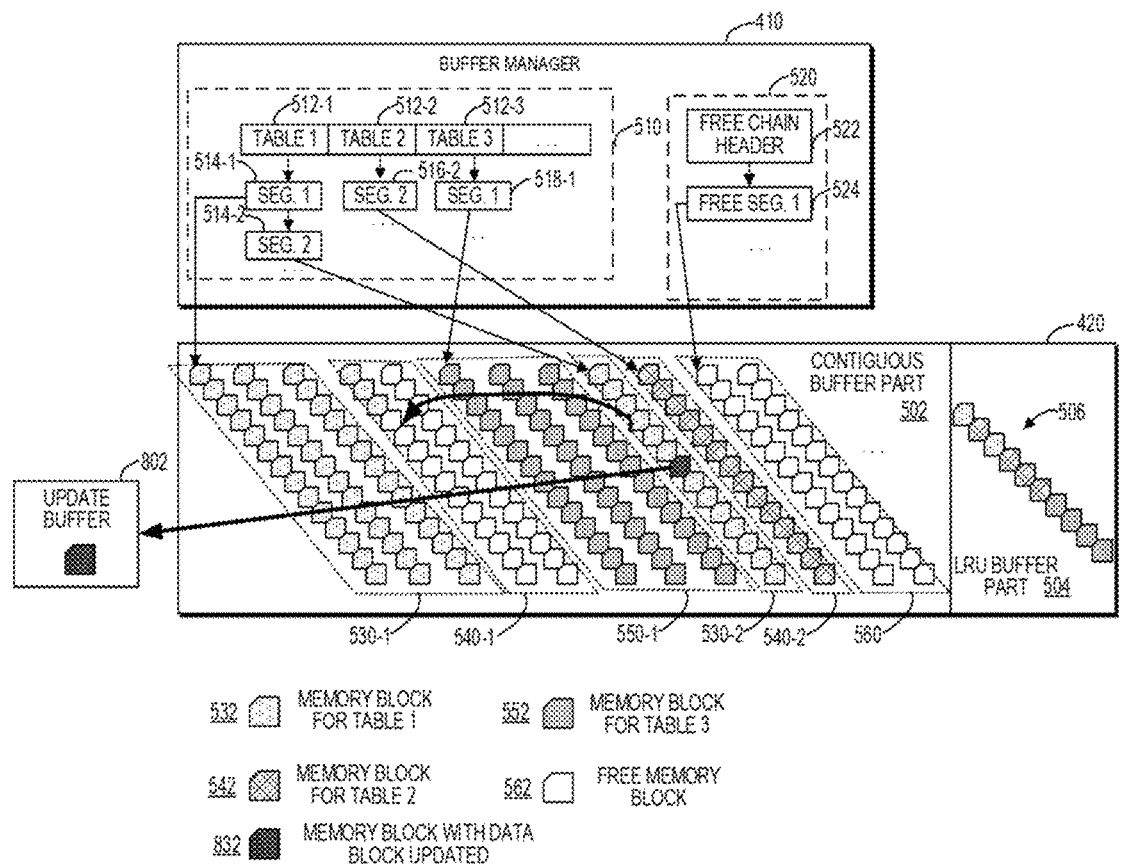
FIG. 8B depicts a second example of buffer segment merging in the buffer architecture, in accordance with the present disclosure.
Figure 8C:
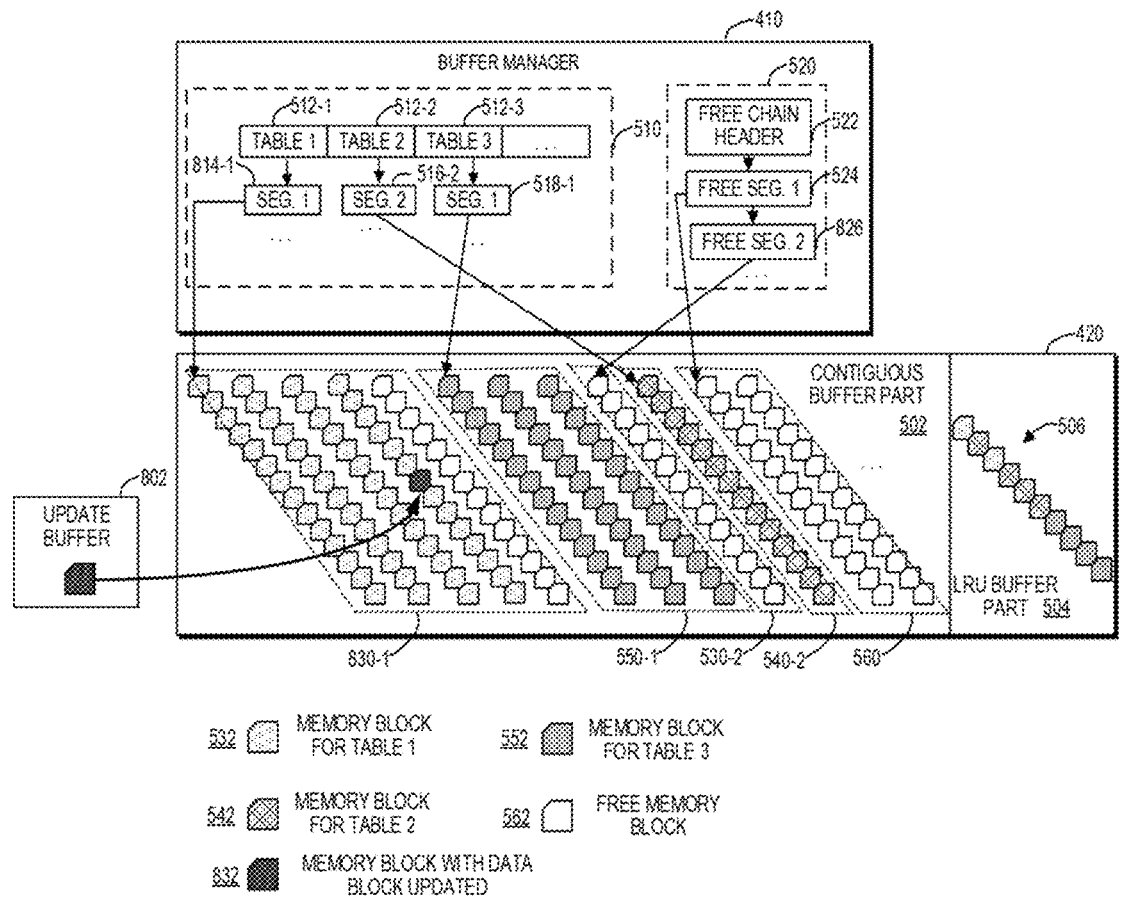
FIG. 8C depicts a third example of buffer segment merging in the buffer architecture, in accordance with the present disclosure.

FIGS. 8A-8C depict examples of buffer segment merging in the buffer architecture in accordance with some embodiments of the present disclosure. As illustrated in FIG. 8A, the buffer segment 540-1 allocated for storing a data partition of the second data table may be reclaimed, thus becoming a free buffer segment. The access information 516-1 maintained for this buffer segment 540-1 may be deleted and the free segment chain 520 updated to include location information 824 of the free buffer segment 540-1.

The buffer manager 410 may determine whether any data table has data partitions stored in non-contiguous buffer segments and then determine whether any of the non-contiguous buffer segments can be merged using the free buffer segment(s) in the contiguous buffer part 502. In the example associated with FIG. 8A, the buffer manager 410 may determine that the buffer segment 530-1 is non-contiguous with the buffer segment 530-2 for the first data table and may also detect that there is a free buffer segment 540-1 located immediately after the buffer segment 530-1. As such, the buffer manager 410 may determine that the data partition stored in the buffer segment 530-2 may be migrated or moved to the free buffer segment 540-1.

In some embodiments, the buffer manager 410 may determine whether the size of the free buffer segment 540-1 is larger than or equal to the size of the data partition stored in the buffer segment 530-2. In embodiments where the free buffer segment 540-1 has sufficient memory space for storing the data partition stored in the buffer segment 530-2, the buffer manager 410 may determine that the free buffer segment 540-1 may be allocated to store the data partition that was moved from the buffer segment 530-2. In some embodiments, if the size of the free buffer segment 540-1 is larger than the size of the data partition stored in the buffer segment 530-2, the buffer manager 410 may determine to allocate all the free buffer segment 540-1 to merge with the buffer segment 530-1. Alternatively, the buffer manager 410 may determine to allocate some free memory blocks from the free buffer segment 540-1 that are enough for storing the data partition. In the example associated with FIG. 8B, the buffer segment 540-1 may be all allocated to store the migrated data partition even if its size is larger than the size of the migrated data partition. In embodiments, as the buffer segment 540-1 is allocated again to store data, the location information 824 for this buffer segment may be removed from the free segment chain 520, as illustrated in FIG. 8B.

In embodiments, to avoid data inconsistency resulting from the time delay associated with data migration, the buffer manager 410 apply a latch to the data partition stored in the buffer segment 530-2. This latch application may prevent any data update to the data partition stored in the buffer segment 530-2 from being executed. In embodiments, the data update may be applied to the data partition migrated to the buffer segment 540-1. As the data migration may take a significant period of time when the data size is large, the application of the latch may cause some I/O transaction delay. In some embodiments, such as those illustrated in FIG. 8B, a separate update buffer 802 may be introduced to support concurrent data migration and data update.

During the data migration, the buffer manager 410 may result in data blocks being copied from the buffer segment 530-2 to the buffer segment 540-1. In embodiments, if a data block stored in a memory block 832 of the buffer segment 530-2 is updated during the data migration, the buffer manager 410 may write the updated data block into the update buffer 802. In some embodiments, the buffer manager 410 may trigger a double write mechanism to concurrently write the updated data block in the memory block 832 to the update buffer 802. In some embodiments, a location of the updated data block may also be recorded in the update buffer 802.

In embodiments, after the data partition has been moved from the buffer segment 530-2 to the buffer segment 540-1 which is contiguous with the buffer segment 530-1, the buffer segment 530-1 and the buffer segment 540-1 may be merged and considered as a single buffer segment 830-1, such as those embodiments illustrated in FIG. 8C, with a merged contiguous range of memory. After the data migration is completed, the buffer manager 410 may determine a memory block in the merged buffer segment 830-1 is associated with the memory block 832 of the buffer segment 530-2 having the data block updated. The determination of the memory block may be based on the recorded location of the memory block 832. In some embodiments, the buffer manager 410 may replace the data block stored in the determined memory block with the updated data block in the update buffer 802. This ensures the latest updated data block is recorded in the buffer segment 830-1. In some embodiments, the updated data block may be deleted from the update buffer 802 to reclaim the memory.

In embodiments, after the data migration is completed, the access information 514-2 for the buffer segment 530-2 may be removed and the access information 514-1 for the buffer segment 530-1 may be updated as access information 814-1 based on the merged buffer segment 830-1, such as those embodiments illustrated in FIG. 8C. In some embodiments, the updated access information 814-1 may indicate the contiguous range of memory merged from the contiguous buffer segments 530-1 and 840-1 and a reference location(s) for locating the data blocks stored in the contiguous buffer segments 530-1 and 840-1. In some embodiments, the access count in the access information 514-1 is reset in the access information 814-1, in order to record the access count of the merged buffer segment 830-1.

In embodiments, as the data partition is removed out from the buffer segment 530-2, this buffer segment may be reclaimed as a free buffer segment. In some embodiments, the free segment chain 520 may be updated to include location information 826 of the free buffer segment 530-2.

It would be appreciated that FIGS. 8A-8C are provided as an example of buffer segment merging. In other embodiments, data partitions may be stored in two or more allocated and non-contiguous buffer segments for a data table may be copied into a free single buffer segment, and/or copied to a free buffer segment that is contiguous with a further buffer segment allocated for the data table.

Figure 8D:
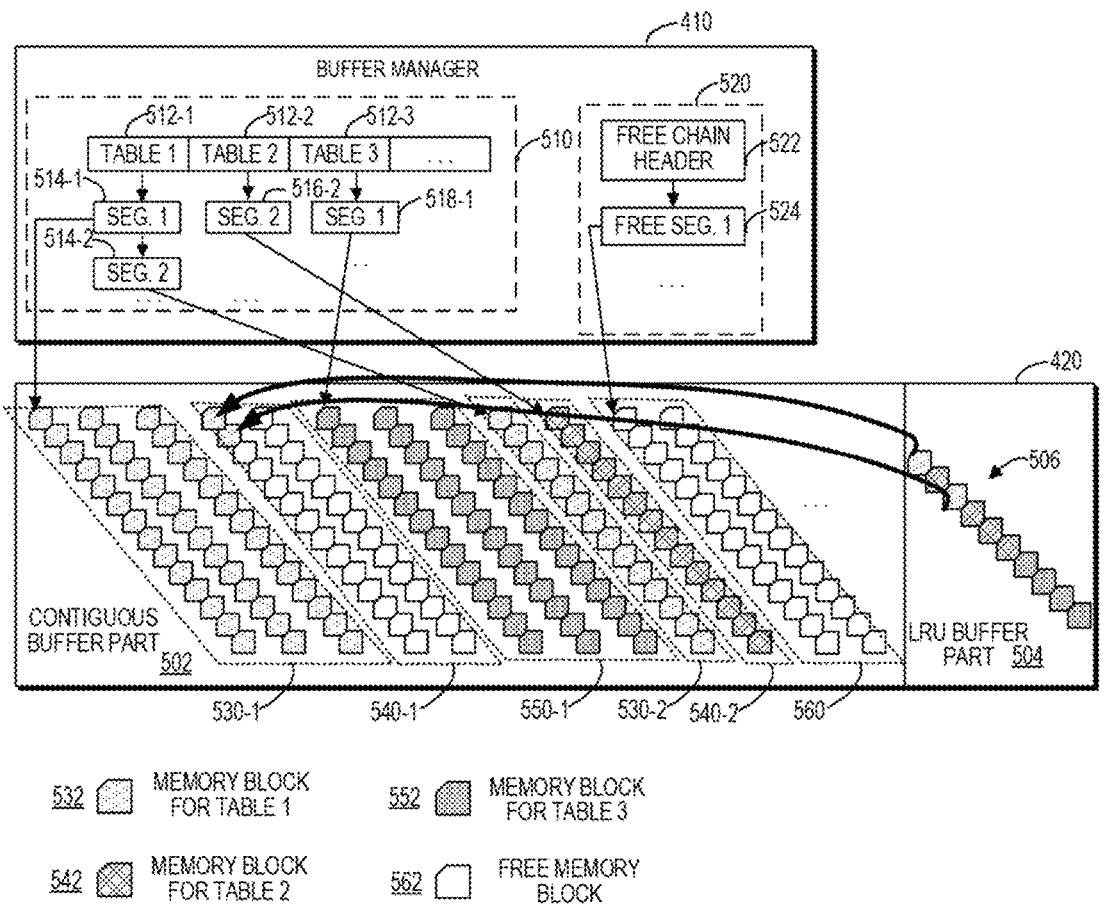
FIG. 8D depicts a fourth example of buffer segment merging in the buffer architecture, in accordance with the present disclosure.

In embodiments, in addition to merging buffer segments in the contiguous buffer part 502, one or more data blocks of a data table in the LRU chain 506 may also be copied into one or more memory blocks in the contiguous buffer part 502 that can be merged with a buffer segment allocated for the same data table. In some embodiments, the one or more data blocks with high access frequencies (e.g., the data blocks queued in the head of the LRU chain 506) may be copied into the contiguous buffer part 502. As illustrated in FIG. 8D, in some embodiments, one or more data blocks for the first data table are stored in memory blocks 532 of the LRU chain 506 and have high access frequencies. The buffer manager 410 may migrate those data blocks to the free buffer segment 540-1 which is contiguous with the buffer segment 530-1. In this embodiment, it may also be assumed that the whole free buffer segment 540-1 may be allocated for storing data blocks of the first data table migrated from the LRU chain 506. The remaining free memory blocks in the buffer segment 540-1 may be used for storing more data blocks of the first data table. After the data migration from the LRU chain 506 is completed, the buffer manager 410 may merge the buffer segments 530-1 and 540-1 and update the access information 514-1. (e.g., as illustrated in FIG. 8C).

In some embodiments, during migrating of data blocks with high access frequencies from the LRU chain 506 into the contiguous buffer part 502, if no memory blocks contiguous with a buffer segment (e.g., a buffer segment that has been allocated for the same data table) the buffer manager 410 may replace data blocks that are stored in suitable memory blocks. In some embodiments, the buffer manager 410 may replace the data blocks stored in suitable memory blocks having low access frequencies with the data blocks having the high access frequencies.

It is noted that the reorganization of the buffer segments and memory blocks in the buffer pool 420 may be flexible to ensure large contiguous ranges of memory used for storing data of a same data table.

It would be appreciated that the numbers of data tables, segments, and memory blocks are provided in the FIGS. are merely for the purpose of illustrations and are not intended to be limiting any embodiment contemplated herein. Any other numbers of data tables, buffer segments, and memory blocks may be viewed in the buffer architecture referenced in FIG. 5 and FIGS. 8A-8B.

Figure 9:
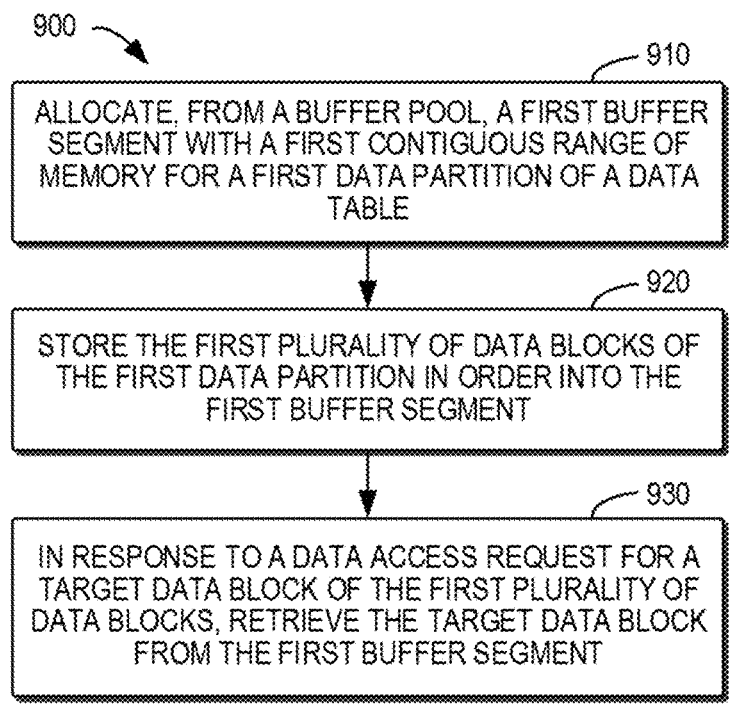
FIG. 9 depicts a flowchart of an example method in accordance with the present disclosure.

FIG. 9 depicts a flowchart of an example method 900 in accordance with embodiments of the present disclosure. The method 900 can be implemented at the buffer manager 410 of FIG. 4.

At block 910, a processor may allocate a first buffer segment with a first contiguous range of memory for a first data partition of a data table from the buffer pool. The first data partition may include a first plurality of data blocks. At block 920, a processor may store the first plurality of data blocks in order into the first buffer segment. At block 930, responsive to a data access request for a target data block of the first plurality of data blocks, a processor may retrieve the target data block from the first buffer segment.

In some embodiments, the method 900 further comprises a processor maintaining first access information for the first buffer segment. The first access information may indicate at least the first contiguous range of memory and a reference location for locating the first plurality of data blocks. In some embodiments, a processor may retrieve the target data block by locating the target data block in the first buffer segment based on the first access information. With the location of the target data block in the first buffer segment determined, in some embodiments, a processor can read the target data block from the determined location.

In some embodiments, the first access information may further indicate an access count of the first data partition. In some embodiments, a processor may increase the access count in response to the data access request. In some embodiments, a processor may determine a reclaim of the first buffer segment based on the access count.

In some embodiments, the buffer pool may include a second buffer segment with a second contiguous range of memory. In embodiments, a processor may allocate the second contiguous range of memory for storing a second data partition of the data table. In these embodiments, the second data partition may include a second plurality of data blocks stored in order. In some embodiments, a processor may allocate the first buffer segment. In embodiments, allocating the first buffer segment may include a processor determining whether there is a free buffer segment in the buffer pool that is contiguous with the second buffer segment. In these embodiments, a processor (e.g., buffer manager) may determine that a first free buffer segment in the buffer pool is contiguous with the second buffer segment. In these embodiments, a processor may allocate the first free buffer segment as the first buffer segment for the first data partition. In embodiments, a processor may determine that the buffer pool fails to comprise a free buffer segment contiguous with the second buffer segment. In this embodiment, a processor may allocate a second free buffer segment that is non-contiguous with the second buffer segment (e.g., as the first buffer segment).

In some embodiments, a processor may determine that the first buffer segment is contiguous with the second buffer segment. In these embodiments, a processor may maintain second access information for a merged buffer segment comprising the first and second buffer segments. The second access information may indicate at least a contiguous range of memory merged from the first and second contiguous ranges of memory and a reference location. The reference location may be used to locate the first plurality of data blocks and the second plurality of data blocks.

In some embodiments, a processor may allocate the first buffer segment with a size larger than or equal to a lower limit of size.

In some embodiments, a processor may determine that a size of the first data partition exceeds a size of the first buffer segment. In these embodiments, a processor may store data of the first data partition overflowing from the first buffer segment into a least recently used (LRU) chain in the buffer pool. The LRU chain may include a plurality of memory blocks.

In some embodiments, the buffer pool may include a third buffer segment with a third contiguous range of memory allocated for storing a third data partition of the data table, the third data partition may include a third plurality of data blocks stored in order. In some embodiments, a processor may determine that the third buffer segment is non-contiguous with the first buffer segment. In these embodiments, a processor may determine whether there is a third free buffer segment in the buffer pool that is contiguous with the first buffer segment and available for storing the third data partition. In some embodiments, a processor may determine that there is the third free buffer segment. In these embodiments, a processor may migrate the third data partition from the third buffer segment to the third free buffer segment. In these embodiments, a processor may reclaim the third buffer segment, and update the first access information based on the third free buffer segment.

In embodiments, a processor may determine that a data block of the third data partition stored in a target memory block of the third buffer segment is updated during the migrating, writing the updated data block into an update buffer. In embodiments, a processor may determine that the migration is completed. In these embodiments, a processor may replace a data block stored in a memory block of the third free buffer segment corresponding to the target memory block of the third buffer segment with the updated data block in the update buffer.

In some embodiments, a processor may maintain a free segment chain to indicate location information of at least one free buffer segment in the buffer pool. In some embodiments, a processor may remove location information of the third free buffer segment from the free segment chain. In some embodiments, a processor may, in response to reclaiming the third buffer segment, update the free segment chain to indicate location information of the third buffer segment.

It should be noted that the buffer pool management or the buffer manager 410, according to embodiments of this disclosure, may be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the FIGS. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
allocating from a buffer pool, by one or more processors, a first buffer segment with a first contiguous range of memory for a first data partition of a data table, the first data partition comprising a first plurality of data blocks;
determining a third buffer segment of the buffer pool is non-contiguous with the first buffer segment, wherein the third buffer segment includes a third contiguous range of memory allocated for storing a third data partition of the data table having a third plurality of data blocks stored in order, wherein determining the third buffer segment of the buffer pool is non-contiguous with the first buffer segment is based on determining a third free buffer segment in the buffer pool is contiguous with the first buffer segment and available for storing the third data partition;
storing the first plurality of data blocks in order into the first buffer segment; and
retrieving, responsive to a data access request for a target data block of the first plurality of data blocks, the target data block from the first buffer segment.

2. The method of claim 1, further comprising:
maintaining first access information for the first buffer segment, wherein the first access information indicates at least the first contiguous range of memory and a reference location for locating the first plurality of data blocks; and
locating the target data block in the first buffer segment based on the first access information.

3. The method of claim 2, further comprising:
determining a reclaim of the first buffer segment based on an access count, wherein the first access information further indicates the access count of the first data partition, and wherein the access count is increased responsive to the data access request.

4. The method of claim 1, wherein allocating the first buffer segment further includes:
determining a free buffer segment in the buffer pool is contiguous with a second buffer segment; wherein the second buffer segment includes a second contiguous range of memory allocated for storing a second data partition of the data table, wherein the second data partition includes a second plurality of data blocks stored in order; and
allocating the first free buffer segment as the first buffer segment for the first data partition.

5. The method of claim 4, further including:
maintaining second access information for a merged buffer segment comprising the first buffer segment and the second buffer segment, wherein the second access information indicates at least a contiguous range of memory merged from the first contiguous range of memory and the second contiguous range of memory and a reference location for locating the first plurality of data blocks and the second plurality of data blocks.

6. The method of claim 1, further comprising:
determining a size of the first data partition exceeds a size of the first buffer segment;
storing data of the first data partition overflowing from the first buffer segment into a least recently used (LRU) chain in the buffer pool, wherein the LRU chain includes a plurality of memory blocks.

7. The method of claim 1, wherein determining the third buffer segment of the buffer pool is non-contiguous with the first buffer segment, further includes:
migrating the third data partition from the third buffer segment to the third free buffer segment;
reclaiming the third buffer segment; and
updating the first access information based on the third free buffer segment.

8. The method of claim 7, further including:
determining a data block of the third data partition stored in a target memory block of the third buffer segment is updated to form an updated data block while migrating the third data partition from the third buffer segment to the third free buffer segment;
writing the updated data block into an update buffer;
determining that migrating the third data partition from the third buffer segment to the third free buffer segment is completed; and
replacing a data block stored in a memory block of the third free buffer segment associated with the target memory block of the third buffer segment with the updated data block in the update buffer.

9. The method of claim 7, further including:
removing location information of the third free buffer segment from a free segment chain, wherein the free segment chain includes the location information of at least one free buffer segment in the buffer pool; and
updating, responsive to the reclaiming of the third buffer segment, the free segment chain, wherein updating the free segment chain includes the location information of the third buffer segment.

10. A system comprising:
a processing unit; and
a memory coupled to the processing unit and storing instructions thereon, the instructions, when executed by the processing unit, performing functions comprising:
allocating from a buffer pool, by one or more processors, a first buffer segment with a first contiguous range of memory for a first data partition of a data table, the first data partition comprising a first plurality of data blocks;
determining a third buffer segment of the buffer pool is non-contiguous with the first buffer segment, wherein the third buffer segment includes a third contiguous range of memory allocated for storing a third data partition of the data table having a third plurality of data blocks stored in order, wherein determining the third buffer segment of the buffer pool is non-contiguous with the first buffer segment is based on determining a third free buffer segment in the buffer pool is contiguous with the first buffer segment and available for storing the third data partition;
storing the first plurality of data blocks in order into the first buffer segment; and
retrieving, responsive to a data access request for a target data block of the first plurality of data blocks, the target data block from the first buffer segment.

11. The system of claim 10, wherein the functions further include:
maintaining first access information for the first buffer segment, wherein the first access information indicates at least the first contiguous range of memory and a reference location for locating the first plurality of data blocks; and
locating the target data block in the first buffer segment based on the first access information.

12. The system of claim 10, wherein allocating the first buffer segment further includes:
    determining a free buffer segment in the buffer pool is contiguous with a second buffer segment; wherein the second buffer segment includes a second contiguous range of memory allocated for storing a second data partition of the data table, wherein the second data partition includes a second plurality of data blocks stored in order; and
    allocating the first free buffer segment as the first buffer segment for the first data partition.

13. The system of claim 12, wherein the functions further include:
    maintaining second access information for a merged buffer segment comprising the first buffer segment and the second buffer segment, wherein the second access information indicates at least a contiguous range of memory merged from the first contiguous range of memory and the second contiguous range of memory and a reference location for locating the first plurality of data blocks and the second plurality of data blocks.

14. The system of claim 10, wherein determining the third buffer segment of the buffer pool is non-contiguous with the first buffer segment, the functions further include:
    migrating the third data partition from the third buffer segment to the third free buffer segment;
    reclaiming the third buffer segment; and
    updating the first access information based on the third free buffer segment.

15. The system of claim 14, wherein the functions further include:
    determining a data block of the third data partition stored in a target memory block of the third buffer segment is updated to form an updated data block while migrating the third data partition from the third buffer segment to the third free buffer segment;
    writing the updated data block into an update buffer;
    determining that migrating the third data partition from the third buffer segment to the third free buffer segment is completed; and
    replacing a data block stored in a memory block of the third free buffer segment associated with the target memory block of the third buffer segment with the updated data block in the update buffer.

16. The system of claim 14, wherein the functions further include:
    removing location information of the third free buffer segment from a free segment chain, wherein the free segment chain includes the location information of at least one free buffer segment in the buffer pool; and
    updating, responsive to the reclaiming of the third buffer segment, the free segment chain, wherein updating the free segment chain includes the location information of the third buffer segment.

17. A computer program product being tangibly stored on a non-transient machine-readable medium and comprising machine-executable instructions, the instructions, when executed on a device, causing the device to perform operations comprising:
    allocating from a buffer pool, by one or more processors, a first buffer segment with a first contiguous range of memory for a first data partition of a data table, the first data partition comprising a first plurality of data blocks;
    determining a third buffer segment of the buffer pool is non-contiguous with the first buffer segment, wherein the third buffer segment includes a third contiguous range of memory allocated for storing a third data partition of the data table having a third plurality of data blocks stored in order, wherein determining the third buffer segment of the buffer pool is non-contiguous with the first buffer segment is based on determining a third free buffer segment in the buffer pool is contiguous with the first buffer segment and available for storing the third data partition;
    storing the first plurality of data blocks in order into the first buffer segment; and
    retrieving, responsive to a data access request for a target data block of the first plurality of data blocks, the target data block from the first buffer segment.

18. The computer program product of claim 17, wherein determining the third buffer segment of the buffer pool is non-contiguous with the first buffer segment, the functions further include:
    migrating the third data partition from the third buffer segment to the third free buffer segment;
    reclaiming the third buffer segment; and
    updating the first access information based on the third free buffer segment.

19. The computer program product of claim 18, wherein the operations further include:
    determining a data block of the third data partition stored in a target memory block of the third buffer segment is updated to form an updated data block while migrating the third data partition from the third buffer segment to the third free buffer segment;
    writing the updated data block into an update buffer;
    determining that migrating the third data partition from the third buffer segment to the third free buffer segment is completed; and
    replacing a data block stored in a memory block of the third free buffer segment associated with the target memory block of the third buffer segment with the updated data block in the update buffer.

20. The computer program product of claim 18, wherein the operations further include:
    removing location information of the third free buffer segment from a free segment chain, wherein the free segment chain includes the location information of at least one free buffer segment in the buffer pool; and
    updating, responsive to the reclaiming of the third buffer segment, the free segment chain, wherein updating the free segment chain includes the location information of the third buffer segment.

* * * * *